(12) United States Patent
Vahidi et al.

(10) Patent No.: US 10,922,664 B2
(45) Date of Patent: *Feb. 16, 2021

(54) WEB BASED REPAIR COST ESTIMATING SYSTEM

(71) Applicant: Audatex North America, Inc., Addison, TX (US)

(72) Inventors: Seyed Rexa Vahidi, Pleasanton, CA (US); Stan Griffin, Livermore, CA (US); Pankaj V. Desai, San Ramon, CA (US); Sonja Larson, Benicia, CA (US); Steve Glendenning, San Ramon, CA (US)

(73) Assignee: Audatex North America, Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/014,092

(22) Filed: Aug. 29, 2013

(65) Prior Publication Data

US 2014/0067637 A1    Mar. 6, 2014

Related U.S. Application Data (62) Division of application No. 11/115,867, filed on Apr. 26, 2005, now abandoned.

(51) Int. Cl.
| G06Q 40/08 | (2012.01) |
| G06Q 10/00 | (2012.01) |
| G06Q 10/10 | (2012.01) |
| G06Q 30/02 | (2012.01) |

(52) U.S. Cl.
CPC ......... *G06Q 10/20* (2013.01); *G06Q 10/10* (2013.01); *G06Q 30/0206* (2013.01); *G06Q 30/0283* (2013.01); *G06Q 40/08* (2013.01)

(58) Field of Classification Search
USPC .............................. 705/5, 7.11, 305, 4; 703/8
See application file for complete search history.

(56) References Cited

U.S. PATENT DOCUMENTS

| 5,504,674 A | 4/1996 | Chen et al. |
| 5,839,112 A | 11/1998 | Schreitmueller et al. |
| 5,950,169 A | 9/1999 | Borghesi et al. |

(Continued)

OTHER PUBLICATIONS

Business Wire, Inc., CCC Information Services and Farmers Insurance Exchange Sign Exclusive Agreement, Three-Year Exclusive Agreement to Include Pathways Appraisal Solution and TL2000, Dec. 11, 2000, Business Editors.

(Continued)

*Primary Examiner* — Akiba K Robinson
(74) *Attorney, Agent, or Firm* — Baker Botts L.L.P.

(57) ABSTRACT

A web based insurance estimating system. The system includes a client computer that can launch client-side integrated processing software through a web-based application. The system also includes a server that generates information for a repair cost estimate web page. The repair cost estimate web page is displayed at the client computer. The repair cost estimate web page has properties that can be configured by a user at the client computer. The server can automatically populate fields of one or more web pages in response to a vehicle identification number entered by the user.

15 Claims, 8 Drawing Sheets

(56) References Cited

U.S. PATENT DOCUMENTS

| | | | |
|---|---|---|---|
| 6,185,540 B1* | 2/2001 | Schreitmueller | G06Q 30/06 705/4 |
| 6,397,131 B1 | 5/2002 | Busch et al. | |
| 7,324,951 B2 | 1/2008 | Renwick et al. | |
| 7,376,573 B1 | 5/2008 | Costonis et al. | |
| 7,406,427 B1 | 7/2008 | Guyan et al. | |
| 7,441,225 B2 | 10/2008 | Boutin et al. | |
| 7,953,615 B2 | 5/2011 | Aquila et al. | |
| 2002/0002475 A1 | 1/2002 | Freedman et al. | |
| 2002/0026334 A1 | 2/2002 | Igoe | |
| 2002/0035488 A1 | 3/2002 | Aquila et al. | |
| 2002/0049618 A1* | 4/2002 | McClure et al. | 705/4 |
| 2002/0065707 A1 | 5/2002 | Lancaster et al. | |
| 2002/0084891 A1 | 7/2002 | Mankins et al. | |
| 2002/0107873 A1 | 8/2002 | Winkler et al. | |
| 2002/0116228 A1 | 8/2002 | Bauer et al. | |
| 2002/0164962 A1 | 11/2002 | Mankins et al. | |
| 2002/0188479 A1 | 12/2002 | Renwick et al. | |
| 2002/0191843 A1* | 12/2002 | McClanahan | G01J 3/46 382/162 |
| 2003/0036964 A1 | 2/2003 | Boyden et al. | |
| 2003/0050843 A1 | 3/2003 | Onoue | |
| 2003/0093302 A1 | 5/2003 | Quido et al. | |
| 2003/0097242 A1* | 5/2003 | Strumolo | B05B 12/00 703/2 |
| 2004/0030587 A1 | 2/2004 | Danico et al. | |
| 2004/0073434 A1 | 4/2004 | Volquardsen et al. | |
| 2004/0153346 A1 | 8/2004 | Grundel et al. | |
| 2005/0125261 A1* | 6/2005 | Adegan | 705/4 |
| 2005/0131596 A1* | 6/2005 | Cherrington et al. | 701/29 |
| 2005/0171867 A1* | 8/2005 | Doonan | G06Q 10/10 705/26.4 |
| 2005/0246206 A1 | 11/2005 | Obora et al. | |
| 2006/0004612 A1 | 1/2006 | Chewning et al. | |
| 2006/0064393 A1* | 3/2006 | Orr | 705/400 |
| 2006/0129423 A1 | 6/2006 | Sheinson et al. | |
| 2006/0183458 A1* | 8/2006 | Sena | C09D 7/80 455/403 |
| 2008/0301008 A1* | 12/2008 | DePrisco et al. | 705/28 |

OTHER PUBLICATIONS

PR Newswire Association, Inc., CCC's DriveLogic(TM) to Launch First End-to-End Internet Solution for Auto Collision Supply Chain, Seeks to Enhance Supply Chain Efficiencies, Cut Average Claims Cycle Time in Half, Aug. 3, 2000.

Business Wire, Inc., CCC Introduces Internet-Based ClaimScope Navigator; CCC Launches Web-Based Insurance Information Solution, Jul. 24, 2000.

Business Wire, Inc., CCC Introduces Web-Enabled Total Loss Solution to Automotive Claims Industry; Solution to Help Streamline the Claims Settlement Process, Jul. 12, 2000.

Business Wire, Inc., Mitchell International Extends e-Business Offerings; Ensera Products Add New Services and Broaden Depth of Functionality, Nov. 30, 2001.

Business Wire, Inc., Mitchell International Signs Major Contract with Members of the Great American Insurance Group, Nov. 6, 2001.

Thomson Financial, Newsline Briefs Insurance Networking & Data Management, Nov. 2001, American Banker-Bond Buyer, a division of Thomason Publishing Corporation.

Mitchell Program Values Automobile Settlements, The National Underwriter Company Claims Magazine, Oct. 2001.

Business Wire, Inc., Mitchell International Announces Nationwide Availability of iNTOTAL.com Total Loss Settlement Solution, Jun. 25, 2001.

Business Wire, Inc., Mitchell Adds Commercial Release of AIM Online to its Suite of Internet Products for the Collision Repair and Claims Industry, Apr. 2, 2001.

Business Wire, Inc., New Functionality At eMitchell.com Enables "End to End" One-line Collision Repair Claims Processing, Feb. 5, 2001.

Business Wire, Inc., Mitchell Announces Commercial Availability of FirstImages.com; Joins Growing ASP Content at eMitchell.com; Lowers DRP Start-Up and Maintenance Costs for Insurance Companies, Feb. 5, 2001.

Business Wire, Inc., Mitchell International to Wirelessly Enable Its Internet Hub; Continued Execution of its e-Business Strategy Will Result in Increased Productivity and Cost Savings to Hub Participants, Dec. 8, 2000.

Business Wire, Inc., Mitchell International Delivers New Applications On Internet Hub for the Automotive Collision Repair and Claims Industry, Dec. 8, 2000.

Business Wire, Inc., Mitchell Announces e-Business Strategy With Launch of Internet Hub for Auto Collision Repair Supply Chain, Continues 4-Year Tradition of Industry Leadership and Service.

PR Newswire Association, Inc., Mitchell International Announces FirstEstimate.com, The First Internet-based Estimating System, FirstEstimate.com Part of Larger Mitchell Internet e-business Strategy.

* cited by examiner

WEB BASED REPAIR COST ESTIMATING SYSTEM

CROSS REFERENCE TO RELATED APPLICATIONS

This application is a divisional application of U.S. application Ser. No. 11/115,867 filed Apr. 26, 2005, pending.

BACKGROUND OF THE INVENTION

1. Field of the Invention

The subject matter disclosed generally relates to a method and system for generating a repair cost estimate for a damaged vehicle through a web site.

2. Background Information

When a vehicle such as an automobile is damaged the owner may file a claim with an insurance carrier. A claims adjuster typically inspects the vehicle to determine the amount of damage and the costs required to repair the automobile. The owner of the vehicle or the vehicle repair facility may receive a check equal to the estimated cost of the repairs. If the repair costs exceed the value of the automobile, or a percentage of the car value, the adjuster may "total" the vehicle. The owner may then receive a check equal to the value of the automobile.

The repair costs and other information may be entered by the adjuster into an estimate report. After inspection the adjuster sends the estimate report to a home office for approval. To improve the efficiency of the claims process there have been developed computer systems and accompanying software that automate the estimate process. By way of example, the assignee of the present invention, Automatic Data Processing, Inc, ("ADP") provides a software product under the trademark PenPro that allows a claims adjuster to enter estimate data. The PenPro product has a client side software platform that is loaded into the computer of a client such as a claims adjuster. The client based software interfaces with a home office computer system. The home office computer system contains large databases that store claims records used to process insurance claims.

Client based platforms such as PenPro require a dedicated link to the home office. Dedicated closed systems can be limiting to the client user. There have been developed web based insurance estimating systems. Such systems have limited features and functions for an estimating system. It would be desirable to provide a web based insurance estimating system that has enhanced features/functions over systems of the prior art.

BRIEF SUMMARY OF THE INVENTION

A method and system for retrieving a repair cost estimate web page through a broadband network. The system may include a client computer that launches integrated processing software on the client computer from within a web-based application. The system may also include a server that transmits repair cost estimate web page information and software to process the estimate information to the client computer.

BRIEF DESCRIPTION OF THE DRAWINGS

FIG. 4 is a graphical user interface used to configure properties of web pages;

FIG. 6 is a graphical user interface used to enter a vehicle identification number;

FIG. 11 is a graphical user interface that shows validation controls of the process;

FIG. 12 is a graphical user interface that shows a web page used to estimate a motorcycle;

FIG. 13 is a graphical user interface that shows a web page used to estimate a snowmobile;

FIG. 14 is a graphical user interface that shows a web page used to estimate a personal watercraft.

DETAILED DESCRIPTION

Disclosed is a web based insurance estimating system. The system includes a client computer that can launch integrated client-side processing software through a web-based application. The integrated client-side processing software has the ability to display part information for a vehicle in textual and graphical formats, it may highlight selected graphical and textual representations of vehicle parts, it can calculate damage line costs, it can display all available operations for parts and labor on the vehicle and allow the user to select one or more operations for a part or change data values for any operation for a part, it can search for part information on the vehicle using textual search keys, it can provide summary information on the vehicle parts in the part graphics sections, it can display assembly/component information for a plurality of parts, it can display the labor tasks associated with a part, it can display decision support information for operations that can be added to the estimate, it can display a comparison of repair cost to vehicle value, it may be configurable by the user of the system, and it may provide a way to select vehicle sections containing parts using an icon. The system also includes a server that generates information for a repair cost estimate web page. The repair cost estimate web page is displayed at the client computer.

The repair cost estimate web page has properties that can be configured by a user at the client computer. The configurable properties may include settings for language preferences, claim selection screen columns, part selection screens, labor rates, material rates, tax rates, tiered tax rates, part cost adjustment amounts, lists of commonly used estimate operations, repair facility information, aftermarket part preferences, recycled part preferences, mandatory estimate fields, paint cost thresholds, and preferences for importing and exporting of estimate and assignment data. The server can automatically populate fields of one or more web pages in response to a vehicle identification number entered by the user.

The system can provide estimates for vehicles with less than four wheels such as motorcycles, snowmobiles and personal watercraft. One of the insurance damage web pages may graphically identify the location(s) of a paint code plate on a vehicle. The web page may also provide a list of selectable paint codes that allows the user to select a paint code for a vehicle. The system may also have validation controls to validate the entry of data by the user. The validation controls may validate the presence, content, and/or format of the data. The validation controls may contain field formatting characters such as parenthesis and dashes in phone numbers which do not need to be entered by the user and will be skipper over when the user enters data.

Figure 1:
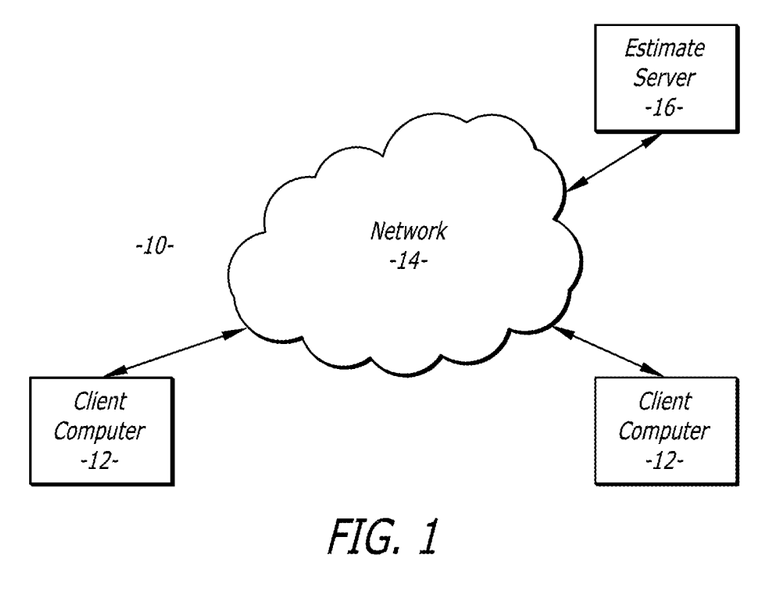
FIG. 1 is a schematic of a network system that can be used to generate a repair cost estimate report through a broadband network.

Referring to the drawings more particularly by reference numbers, FIG. 1 shows a system 10 that can be used to generate a repair cost estimate for an insurance claim of a damaged vehicle. The system 10 includes at least one client computer 12 that is connected to an electronic communication network 14. The electronic communication network 14 may be a wide area network (WAN) such as the Internet. Accordingly, communication may be transmitted through the network 14 in TCP/IP format.

The system 10 may further include an estimate server 16 connected to the network 14. The estimate server 16 may provide a web based portal that provides access to a repair cost estimate web site. The web site may provide a plurality of web pages that can be used by the user of the client computer 12 to generate a repair cost estimate. By way of example, the user may be a claims adjuster that utilizes the web pages to determine the estimate of a damaged vehicle. Although one estimate server 16 is shown, it is to be understood that the estimate server may include two or more separate servers including a web server and an application server that together perform the estimate functions.

Figure 2:
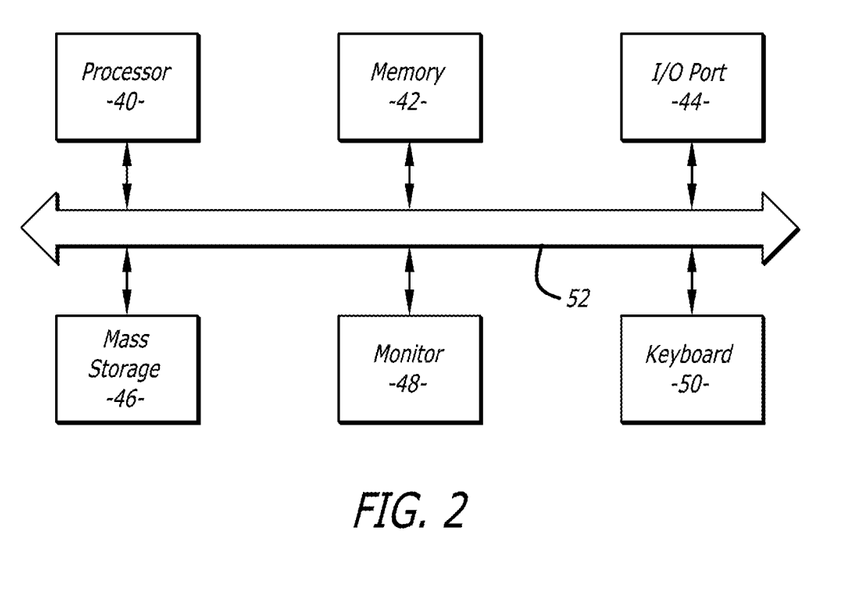
FIG. 2 is a schematic of a computer of the system.

FIG. 2 shows an embodiment of a computer 12 and the server 16. The computer 12 includes a processor 40 connected to one or more memory devices 42. The memory device 42 may include both volatile and non-volatile memory such as read only memory (ROM) or random access memory (RAM). The processor 40 is capable of operating software programs in accordance with instructions and data stored within the memory device 42.

The processor 40 may be coupled to a communication port 44, a mass storage device 46, a monitor 48 and a keyboard 50 through bus 52. The processor 40 may also be coupled to a computer mouse, a touch screen, a microphone, a speaker, an optical code reader (not shown). The communication port 44 may include an ETHERNET interface that allows data to be transmitted and received in TCP/IP format, although it is to be understood that there may be other types of communication ports. The system bus 52 may be a PCI or other conventional computer bus. The mass storage device 46 may include one or more disk drives such as magnetic or optical drives. The mass storage device 46 may also contain software that is operated by the processor 40.

Without limiting the scope of the invention the term computer readable medium may include the memory device 42 and/or the mass storage device 46. The computer readable medium may contain software programs in binary form that can be read and interpreted by the computer. In addition to the memory device 42 and/or mass storage device 46, computer readable medium may also include a diskette, a compact disc, an integrated circuit, a cartridge, or even a remote communication of the software program. In general the server 16 may contain more memory, additional communication ports and greater processing power than the computer 12.

The server 16 may contain a relational database(s) that correlates data with individual data fields and a relational database management system (RDBMS). The RDBMS of the server 16 may include a reference to a website that can be accessed by the computers 12. The website has a specific uniform resource locator (URL) that can be used to access the site through the network 14. The URL can be entered through a web-based application resident in the client computer 12. By way of example, the web based application may be a browser.

Figure 3:
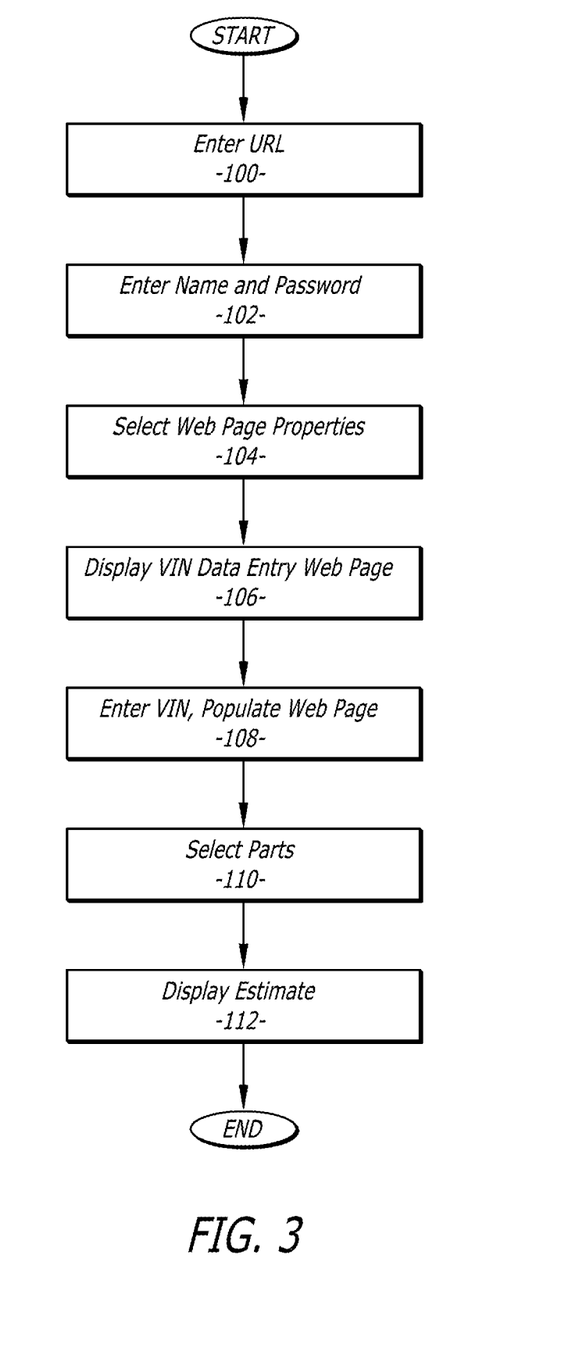
FIG. 3 is a flowchart showing the accessing of a web-based site for generating repair cost estimate information.

FIG. 3 shows a flowchart of a method for accessing the repair cost estimate web site and generating an estimate for a damaged vehicle. In step 100 the user enters a uniform resource locator ("URL") into an address field of a web-based application resident in the client computer. Entry of the URL provides a link between the server 16 and the client computer 12. The user may have to enter a name and password to access the web site in process block 102.

In process block 104 the web site may generate a properties configuration web page. The properties configuration web page allows the user to set properties of the web pages. An example of a configuration web page 200 is shown in FIG. 4. The properties configuration web page may include a global setting section 202 that allows for global settings such as the language of the web pages. The configuration page may allow for the setting of damage page view settings in section 204 and work list columns in section 206. The work list section may allow the user to select certain data fields such as owner name, claim number, etc. that will be displayed by the estimate web pages. The selected properties are displayed every time the web site is accessed by the user.

To facilitate access and interaction with the web site, the client computer 12 may generate and launch client-side integrated processing software commands such as through the web-based application resident on the computer 12. The client-side integrated processing software commands can be used to set the properties of the web pages. By way of example, the integrated processing software commands may be ActiveX controls. The client-side integrated processing software can be downloaded from the server 16. The server 16 may contain one or more server-side software processing modules that provide an interface to the server side component object model ("COM") components. The COM components may include application programs that calculate estimate data, provide parts lists, etc. The COMs may be resident on the estimate server 16 or located in one or more other servers (not shown) that are accessed through the network and instantiated into the server 16. The server-side software processing modules may interface directly with relational databases, non-relational databases, XML files, or other servers.

Figure 5:
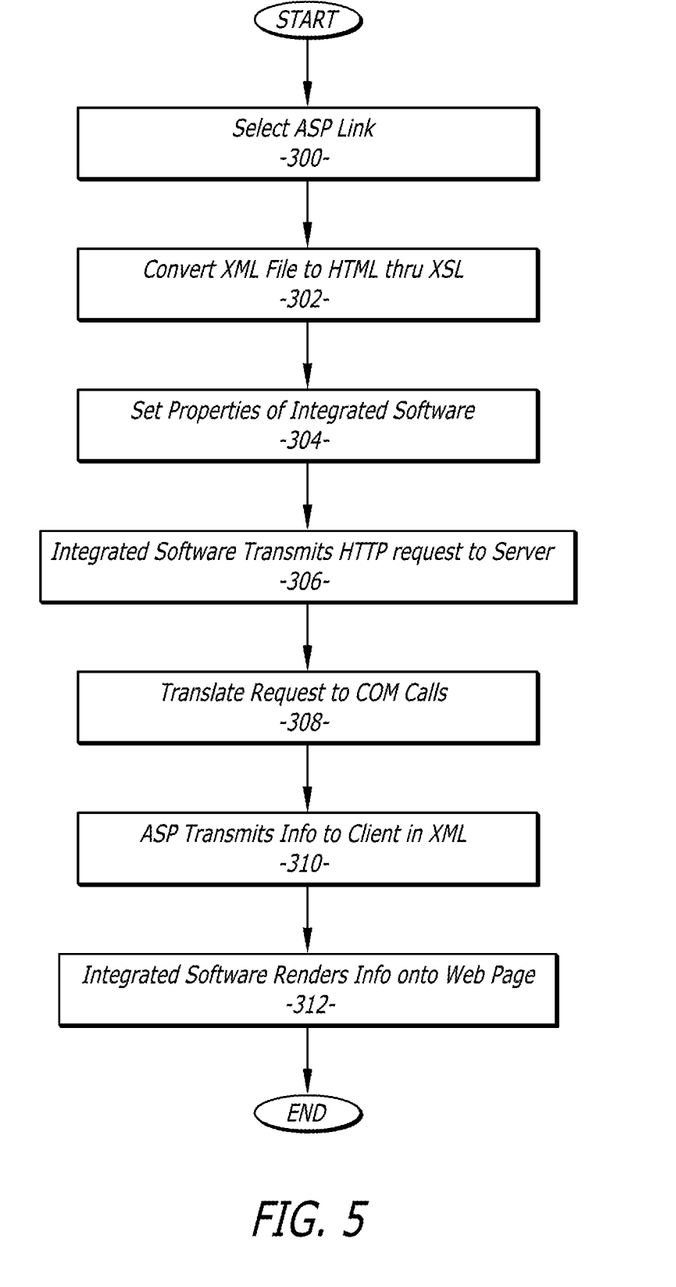
FIG. 5 is a flowchart showing the accessing of a repair cost estimate web-based site.

FIG. 5 is a flowchart showing a background flow for accessing and rendering repair cost estimate web pages. The user may select a damage web page server link in block 300. In block 302 the server-side software processing module triggers a call to pass a file written in extensible markup language ("XML") through a file written in extensible stylesheet language ("XSL") to generate a web page in hytertext markup language ("HTML") that is sent to the client computer. The server may encode and compress data prior to sending it to the client computer. As the web page is rendered, the HTML instructs the web-based application to render the HTML directly into the application or load and set certain properties of the client-side integrated processing software in block 304. This may include the properties selected by the user in the configuration page. If the data sent to the client is encoded, the web-based application may decode it in memory on the client computer. If the data sent to the client was requested by the client-side integrated processing software, the data may be decompressed and decoded for purposes of processing the data and/or rendering the data within the web-based application. For example, the integrated processing software may perform repair cost calculations or render graphical images of vehicles, or vehicle parts and assemblies.

The client-side integrated processing software generates a request in XML format to the server in block 306. The request can be for estimate type data such as the list and cost of parts for a vehicle, graphical information about vehicle sections, or decision support information. The client-side integrated processing software may send a URL to the server containing information about data that needs to be rendered on the client or stored on the server. In block 308 the server-side processing software translates the request into calls to the COM components or other server-side processing software which generate the requested information. The server-side processing software transmits the requested information back to the client computer in XML format in block 310. In block 312 the server-side processing software renders the data into information presented onto the screen of the client computer. This process can be repeated for different information and different web pages of the system.

Referring again to FIG. 3, the web site may display a vehicle identification number ("VIN") data field in processing block 106. The user can enter the VIN of the vehicle in block 108. The web page(s) of the estimator may be automatically populated with data that corresponds to the VIN. This can be done with server side processing software, ASP files, or through a relational database. This may be done by having an ASP file call one or more COM components that contain the corresponding data. By way of example, the data may include standard or option features of an automobile, such as type of engine, transmission, etc.

FIG. 6 shows an example of a web page 210 with a data field 212 that allows a user to enter a VIN. Entering the VIN automatically populates certain fields of the web pages. The web page may have a vehicle information section 214 with data fields that are automatically populated by the entry of the VIN. Alternatively, the user may enter or select data for the data fields in section 214.

Figure 7:
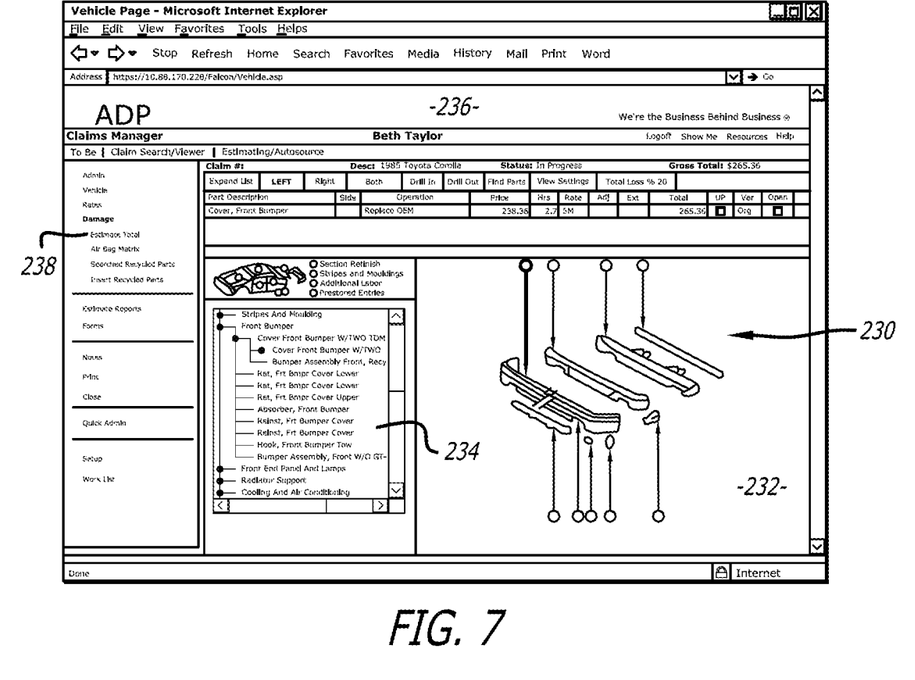
FIG. 7 is a graphical user interface used to enter and/or select damaged parts of a vehicle.
Figure 8:
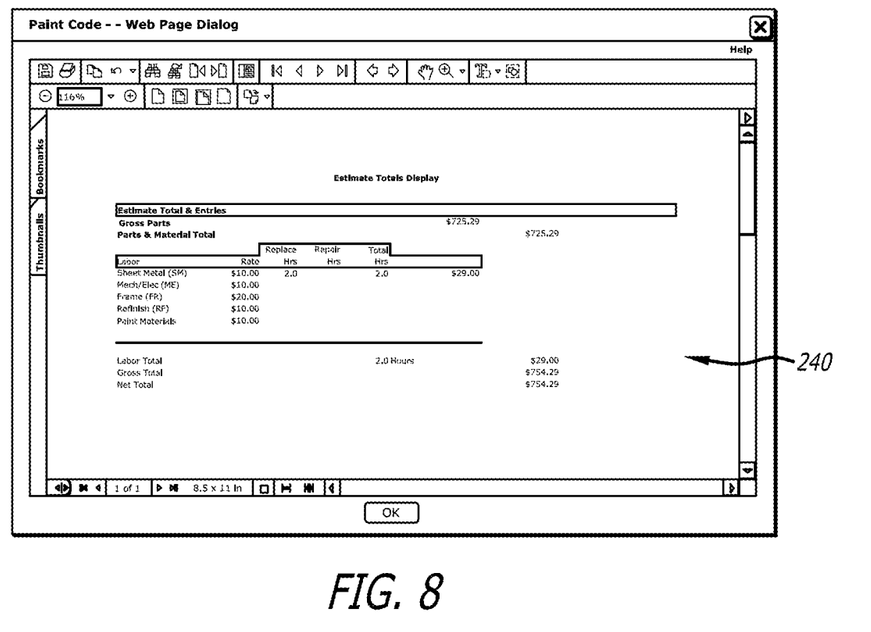
FIG. 8 is a graphical user interface that provides a running cost total for the damaged vehicle.

Referring again to FIG. 3, the user may enter and/or select damage parts for the vehicle in block 110. FIG. 7 shows an example of a web page 230 that allows the user to enter and/or select damaged parts of a vehicle. The web page 230 may include a graphical section 232 that can be selected by the user and a text section 234 that lists a plurality of selectable parts for the vehicle. The parts that are selected to be replaced or repaired can be listed in section 236. An estimate web page can be displayed by selecting the "Estimate Total" link 238 shown in FIG. 7, as described in block 112 of FIG. 3. FIG. 8 shows a web page 240 that displays a running cost total of the estimated damage of the vehicle. The process may have a feature (not shown) that provides a warning to the user that the cost total exceeds a "totaled" value at which point the estimator discontinues the process and totals the vehicle. After all of the parts to be repaired or damaged are selected the adjuster may obtain a final estimate from the estimate page 240.

Figure 9:
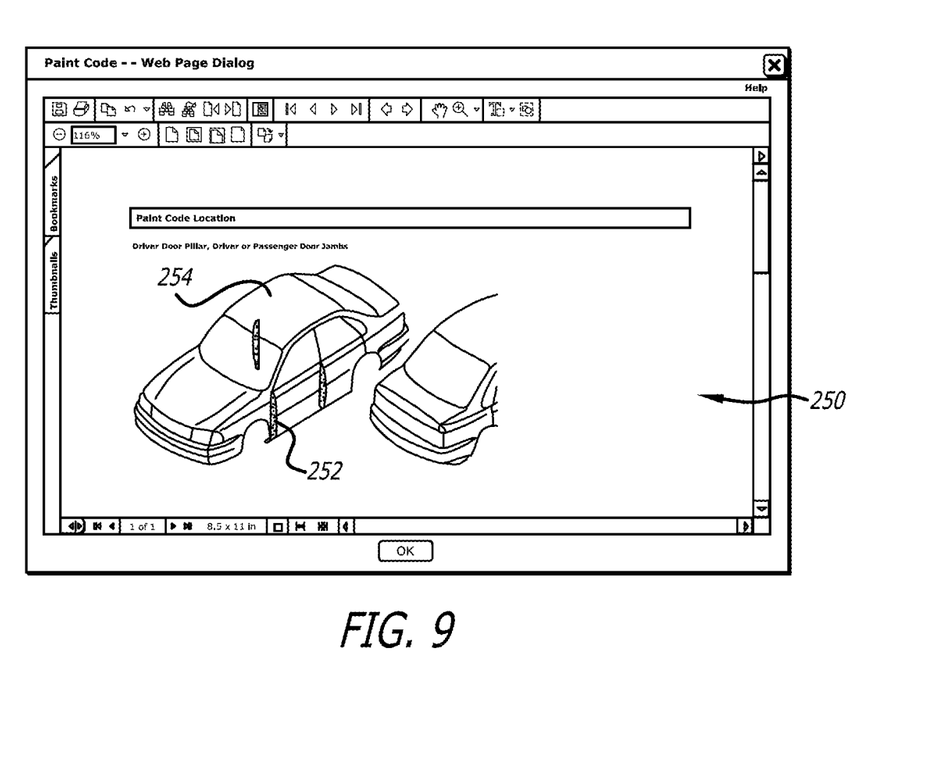
FIG. 9 is a graphical user interface that identifies a paint code locator of a vehicle.

The system may also have other functions and features. FIG. 9 shows a graphical user interface 250 that identifies the location of a paint code locator 252 of a vehicle 254. Every vehicle typically has a plate that contains a paint code of the vehicle. To insure accurate entry of paint data, the adjustor typically reads the paint code. The GUI 250 highlights the location(s) of the paint code plates so that the user can readily find and read the paint code.

Figure 10:
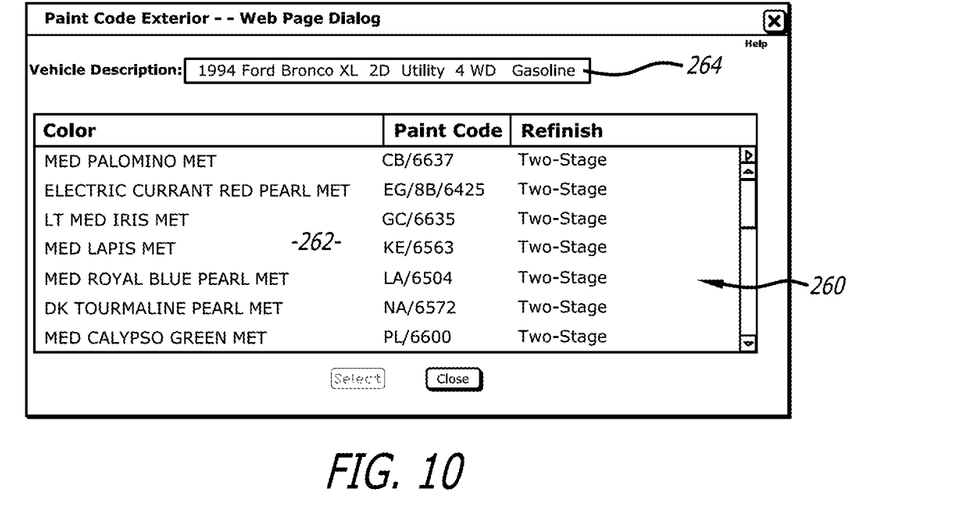
FIG. 10 is a graphical user interface that allows a user to select a paint code from a list of paint codes.

FIG. 10 shows a graphical user interface 260 that allows a user to select from a list of selectable paint codes 262. The list can be generated in response to the entry of a certain vehicle type, etc. in a vehicle description field 264. The list provides different types of paint and corresponding paint codes for the vehicle. Selecting a paint code from a list can eliminate data entry errors associated with manually entering the codes.

The system may have one or more validation controls to minimize data entry errors. The validation controls may be implemented in the server 16 or the integrated processing software. For example, the system may have character level validation control, field level validation control and page level validation control. For field character validation, the process can determine whether an improper character or string of characters have been entered by the user. For example, Canadian postal codes are in a form that requires a sequence of adjacent letters and numbers, such as A9A 9A9. For field valuation a data entry that does not follow this sequence will generate an error message and will not be processed by the system. For character validation the data entered may be ignored and not displayed.

The data fields may contain a validation mask to validate the entry of valid data. FIG. 11 shows a number of masks 270 for different data fields. For example, a date field may have a mask that will only allow numbers and back slashes // to be entered by the user. Additionally, the mask may automatically place entered data. By way of example, regarding a phone number mask, the user may type in the numbers 1, 2, 3 and 4 and the field would display (123) 4 . . . The validation may also flag impossible dates such as an entry for 22/44/5555. The dollar amount field may be masked to only accept numbers and not letters. The page level validation may generate an error report to identify missing or incorrect data entered into the web page.

As shown in FIG. 12, the system may allow an adjuster to estimate damage to a motorcycle. The system may generate a graphical user interface 270 that includes a vehicle information section 272. The information section 272 has a plurality of data fields that allow the adjuster to enter or select identifying information of the motorcycle. FIGS. 13 and 14 shows graphical user interfaces 280 and 290 that can be used to estimate damage to a snowmobile or a personal watercraft, respectively. Each GUI 280 and 290 may have a vehicle information section 282 and 292, that allow an operator to enter or select vehicle information. The system thus allows an adjuster to estimate damage to a motorcycle, a snowmobile, or a personal watercraft through a web based estimating system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system that provides at least one repair cost estimate web page through a broadband network, comprising:

a client computer that can receive a vehicle identification number entered by a user and transmit the vehicle identification number through the broadband network, said client computer displays a graphical user interface that graphically depicts a graphical vehicle and identifies on the graphical vehicle a physical location of a paint code plate on a vehicle that corresponds to said graphical vehicle, the paint code late comprising a paint code of the vehicle that corresponds to said graphical vehicle, said client computer displays a web page that provides a first selectable identifier that when selected provides a vehicle information web page and a second selectable identifier that when selected provides an estimate web page; and, a server that automatically populates in response to entry of the vehicle identification number a repair cost estimate web page displayed by said client computer with vehicle feature data, including engine type, transmission and vehicle option feature data, that corresponds to the vehicle identification number and provides at least one web page that allows a user to select at least one vehicle part and provides a repair cost estimate, that includes a cost to perform a repair, based on said selected vehicle part after auto-population, said server provides a web page with an insured policy number field and a claim number field.

2. The system of claim 1, wherein said vehicle feature data includes a type of engine.

3. The system of claim 1, wherein said repair cost estimate web page provides a list of selectable paint codes.

4. The system of claim 1, wherein said repair cost estimate web page includes validation controls.

5. A system that provides at least one repair cost estimate web page through a broadband network, comprising:

client computer means for receiving a vehicle identification number entered by a user and transmitting the vehicle identification number through the broadband network, said client computer means displays a graphical user interface that graphically depicts a graphical vehicle and identifies on the graphical vehicle a physical location of a paint code plate on a vehicle that corresponds to said graphical vehicle, the paint code plate comprising a paint code of the vehicle that corresponds to said graphical vehicle, said client computer means displays a web page that provides a first selectable identifier that when selected provides a vehicle information web page and a second selectable identifier that when selected provides an estimate web page; and, server means for automatically populating in response to entry of the vehicle identification number a repair cost estimate web page that is displayed by said client computer means with vehicle feature data, including engine type, transmission and vehicle option feature data, that corresponds to the vehicle identification number and provides at least one web page that allows a user to select at least one vehicle part and provides a repair cost estimate, that includes a cost to perform a repair, based on said selected vehicle part after auto-population, said server means provides a web page with an insured policy number field and a claim number field.

6. The system of claim 5, wherein vehicle feature data includes a type of engine.

7. The system of claim 5, wherein said repair cost estimate web page provides a list of selectable paint codes.

8. The system of claim 5, wherein said repair cost estimate web page includes validation controls.

9. A non-transitory computer program storage medium that creates at least one repair cost estimate web page that is transmitted through a broadband network, comprising:

a computer program storage medium that includes a program that causes a server computer to automatically populate in response to an entry of a vehicle identification number a repair cost estimate web page with vehicle feature data, including engine type, transmission and vehicle option feature data, that corresponds to the vehicle identification number received by the server from a client computer and provides at least one web page that allows a user to select at least one vehicle part and provides a repair cost estimate, that includes a cost to perform a repair, based on said selected vehicle part after auto-population, said program causes said server computer to provide a web page with an insured policy number field and a claim number field, and cause a client computer to display a graphical user interface that graphically depicts a graphical vehicle and identifies on the graphical vehicle a physical location of a paint code plate on a vehicle that corresponds to said graphical vehicle, the paint code plate comprising a paint code of the vehicle that corresponds to said graphical vehicle, said client computer displays a web page that provides a first selectable identifier that when selected provides a vehicle information web page and a second selectable identifier that when selected provides an estimate web page.

10. The storage medium of claim 9, wherein said vehicle feature data includes a type of engine.

11. The storage medium of claim 9, wherein said repair cost estimate web page provides a list of selectable paint codes.

12. The storage medium of claim 9, wherein said repair cost estimate web page includes validation controls.

13. A method for providing a least one repair cost estimate web page through a broadband network, comprising:

displaying a web page that provides a first selectable identifier that when selected provides a vehicle information web page and a second selectable identifier that when selected provides an estimate web page;

displaying a web page with an insured policy number field and a claim number field; entering a vehicle identification number into a client computer that displays a repair cost estimate web page;

transmitting through a broadband network the vehicle identification number;

receiving the vehicle identification number at a server;

correlating vehicle feature data with the vehicle identification number by the server; transmitting the vehicle feature data through the broadband network;

populating automatically in response to the entry of the vehicle identification number the repair cost estimate web page with the vehicle feature data, including engine type, transmission and vehicle option feature data, at the client computer;

displaying a plurality of selectable vehicle parts after auto-population;

selecting at least one vehicle part;

displaying a repair cost estimate, that includes a cost to perform a repair, based on said selected vehicle part; and, displaying at a client computer a graphical user interface that graphically depicts a graphical vehicle and identifies on the graphical vehicle a physical location of a paint code plate on a vehicle that corresponds to said graphical vehicle, the paint code plate comprising a paint code of the vehicle that corresponds to said graphical vehicle.

14. The method of claim 13, wherein the vehicle feature data includes a type of engine.

15. The method of claim 13, further comprising selecting one of a plurality of selectable paint codes.

\* \* \* \* \*